Sept. 30, 1969  J. M. TYRNER ET AL  3,469,751
ROLL FOR CONVEYING WEBS
Filed Dec. 14, 1967  2 Sheets-Sheet 1

INVENTORS

ATTORNEYS.

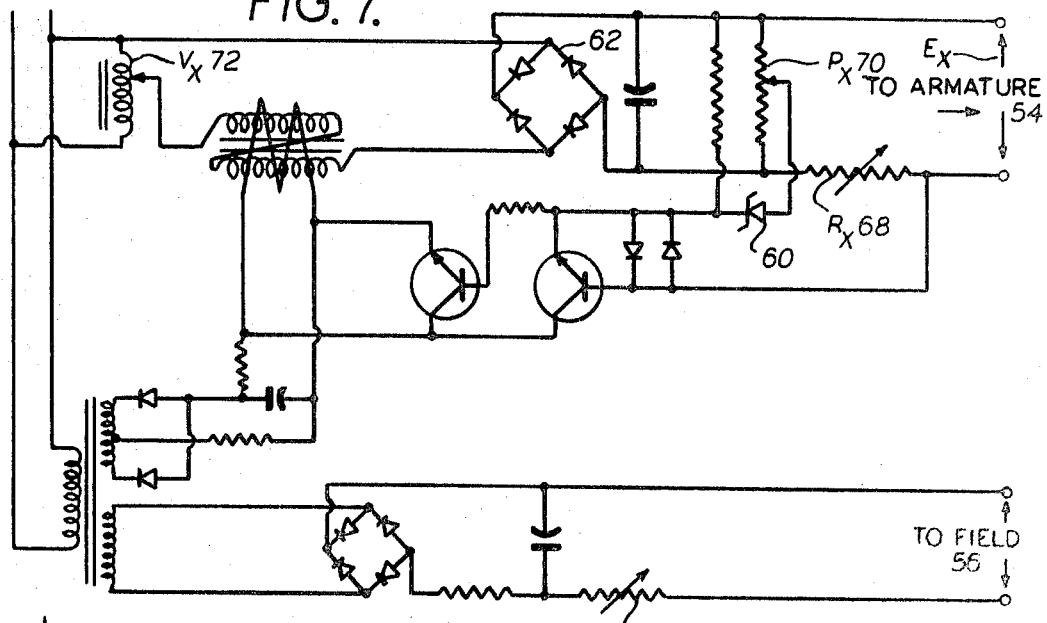
FIG. 7.
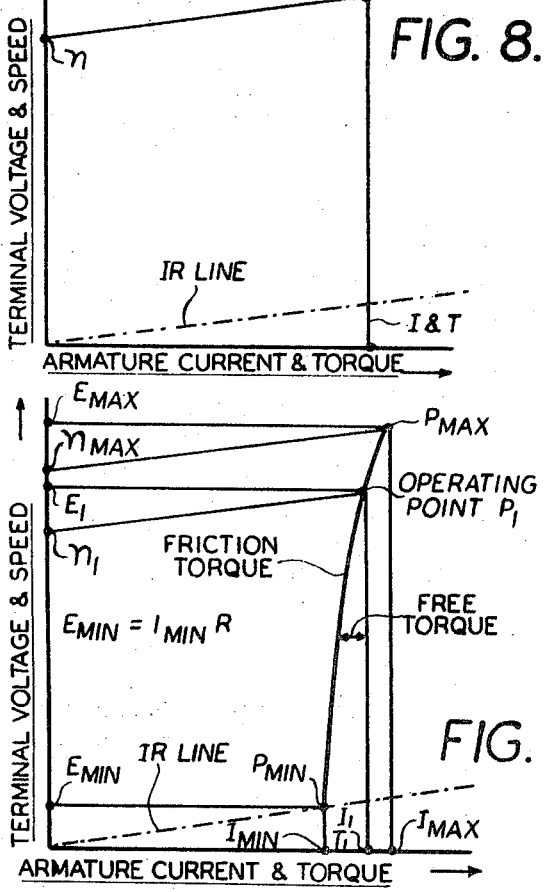
FIG. 8.
FIG. 9.
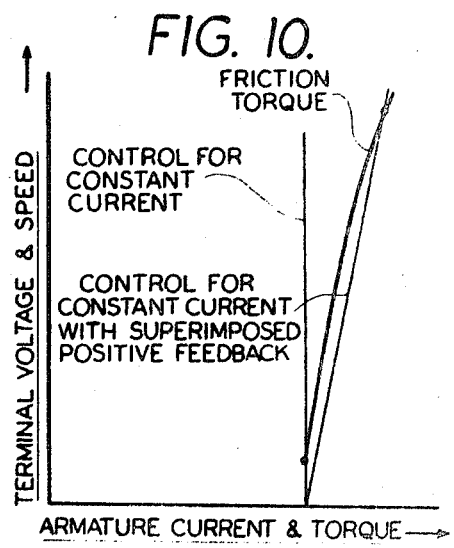
FIG. 10.

United States Patent Office 3,469,751
Patented Sept. 30, 1969

3,469,751
ROLL FOR CONVEYING WEBS
Joseph M. Tyrner, M.R. 17, Morristown, N.J. 07960, and John J. Farrell, 40 Abby Lane, Green Brook, N.J. 08812
Filed Dec. 14, 1967, Ser. No. 690,550
Int. Cl. B65h 25/00, 17/20
U.S. Cl. 226—25        5 Claims

ABSTRACT OF THE DISCLOSURE

This specification discloses a support roll used to keep the free span of a web within acceptable limits. The roll is driven by an electric motor that supplies enough power to compensate the friction of the roll over the whole speed range for which the roll is used. The armature power supply to the motor is essentially a constant current system but the otherwise constant current is overruled by a feed back from the motor which produces an increase in current for an increase in terminal voltage of the motor. The adjustment of the feed back is regulated to cause the power curve for the motor to follow closely the friction curve of the roll with changes in roll speed.

BRIEF DESCRIPTION OF THE INVENTION

In machines on which webs are conveyed, the rotating of support rolls for the web presents problems. If the roll is not power driven, the web itself must provide the motive power and friction in the bearings of the rolls may be objectionable if the web is expandable. Driving the rolls with conventional driving motors has not been satisfactory because the web stretches between successive rolls and the rolls, therefore, have to have different speeds.

It is an object of this invention to drive a support roll by power but with just enough power to compensate friction, and to change the power automatically to compensate changes in friction with changes in speed. By having the friction of the bearings and the bearing seals compensated, conventional bearing lubrication and conventional bearing seals can be used.

With this invention the armature current supply is essentially a constant current system. If a motor is connected to a supply of constant current, the motor torque stays constant from standstill to maximum speed. The characteristics of the load determine the speed and with it, the terminal voltage of the motor.

With this invention the field of the motor is excited by a constant-voltage rectifier circuit. The excitation is controlled by a series resistance and is set for a selected value which is not changed in operation.

For the armature power supply, a constant reference voltage, obtained from a Zener diode, is compared with a voltage drop on a resistance network. The error voltage is amplified and fed to the direct-current coil of a saturated core reactor which controls the armature current.

Control by a saturated core reactor is meant only as illustration of the many means known to people skilled in the art. For instance a silicon controlled rectifier or thyratron tubes may be used to control the current. In these cases the error voltage controls the firing circuit.

The compensation features of the invention are obtained by a positive feed back which overrules the otherwise constant current control. The result is an increase in current for an increase in terminal voltage.

Another special point is the minimum current corresponding to the torque which starts the armature rotation by overcoming the starting friction. The voltage connected with this current is the IR drop for the minimum current because the counterelectromotive force for a barely moving armature is practically zero.

The control of this invention changes the feed back to adjust the torque-speed curve of the motor to a slope that substantially matches the friction curve of the roll. The behavior characteristics of the motor are not changed, but the free torque around the operating point is minimized. There is no point where lack of torque or excess of torque causes stress and strain in the web.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 7 is a more detailed wiring diagram than that shown in FIGURE 6; and

FIGURES 8–11 are graphs illustrating the principle of operation of the invention.

DESCRIPTION OF THE PREFERRED EMBODIMENTS

Figure 1:
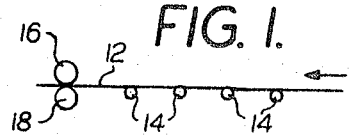
FIGURE 1 is a diagrammatic view showing apparatus in which a web is carried on support rolls.

FIGURE 1 shows apparatus in which a web 12 travels across supporting rolls 14 which are spaced from one another in the direction of the length of the web. The web passes from the support rolls into a roll stand having an upper roll 16 and a lower roll 18, which are power driven. With many types of web, it is undesirable to have the rolls 16 and 18 supply the power to pull the web across the support rolls 14 since this tension on the web may stretch or break the web. It is desirable, therefore, to have the rolls 14 rotate by power which is just sufficient to overcome the friction of the support rolls and to keep them rotating at a peripheral speed exactly equal to the intended speed of the web 12.

Figure 2:
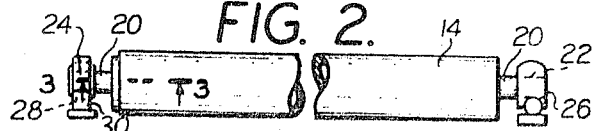
FIGURE 2 is a front view of a support roll made in accordance with this invention.

FIGURE 2 shows a support roll 14 made in accordance with this invention. The roll 14 has axles 20 at its opposite ends and these axles are supported in bearings 22 and 24.

The bearing 22 is self-aligning and is made so by being part of a self-aligning pillow block 26, the construction of which is well understood in the art. The bearing 24 is made self-aligning by providing it with a ball-and-socket connection 28 in a trunnion support 30. In the construction shown in FIGURE 2, the axles 20 do not rotate and the roll 14 is supported on ball bearings located between the inside of the roll 14 and the respective axles 20.

Figure 3:
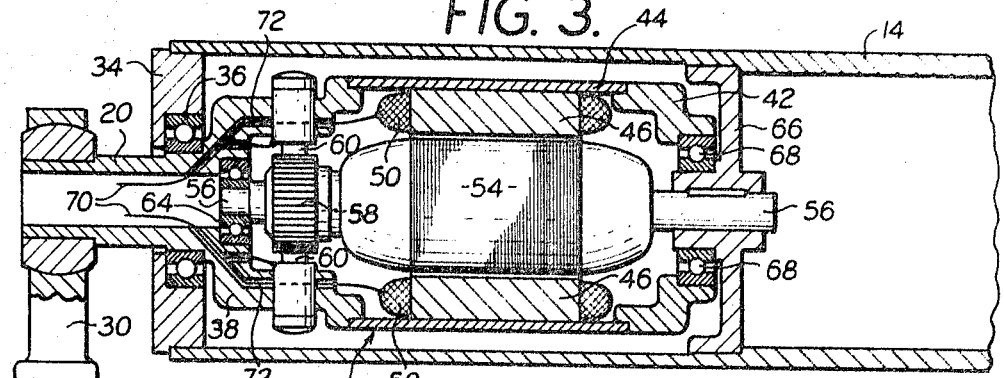
FIGURE 3 is a greatly enlarged sectional view taken on the line 3—3 of FIGURE 2.

FIGURE 3 shows the interior of the roll 14 at its left-hand end. The axle 20 extends through an end wall 34 of the roll 14 and this end wall 34 supports a ball bearing assembly 36 on which the roll 14 rotates. The inner end of the axle 20, beyond the ball bearing 36, is shaped to form an end frame 38 of an electric motor 40.

The motor 40 has an end frame 42 connected with the other end frame 38 by a sleeve 44; and these end frames 38 and 42, together with the sleeve 44, form the motor housing. Field poles 46 are attached to the inside of the motor housing, and more specifically to the sleeve 44. These poles 46 can be permanent magnets but in the drawing are represented as having field windings 50.

The motor 40 has an armature 54 supported on an armature shaft 56. There is a commutator 58 on the shaft 56 and there are brushes 60 carried by the end frame 38.

The left-hand end of the armature shaft 56 rotates in ball bearings 64 carried by the end frame 38, but the right-hand end of the armature shaft 56 is keyed to a partition 66 constituting an integral part of the roll 14. The armature shaft 56 and partition 66 rotate as a unit in ball bearings 68 carried by the end frame 42 of the motor. Conductors 70 for supplying power to the brushes 60 are led through the hollow interior of the axle 20 and through openings 72 in the end frame 38.

The other end of the roll 14 has an end wall similar to the end wall 34 which rotates on ball bearings on the axle 20; and the axle 20 extends in as far as necessary to reach a partition in the roll 14 with other ball bearings to provide the necessary axial length of support to maintain alignment of the right-hand axle 20 with the roll 14.

Figure 4:
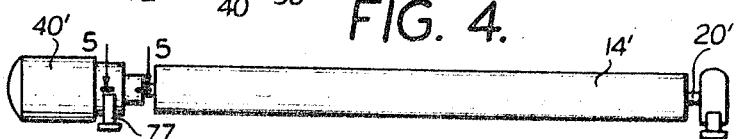
FIGURE 4 is a view similar to FIGURE 2 but showing a modified construction for support rolls of smaller diameter.
Figure 5:
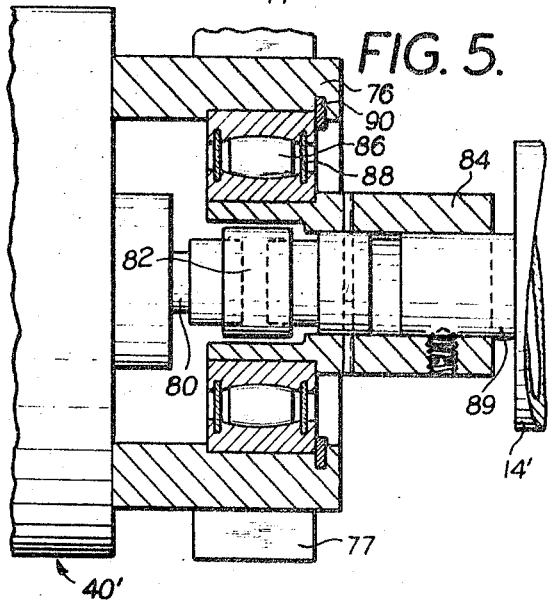
FIGURE 5 is a greatly enlarged sectional view taken on the line 5—5 of FIGURE 4.

FIGURE 4 shows a roll construction in which a roll 14' is of a diameter too small to house a driving motor within the roll. A motor 40' is located outside the roll and on a trunnion support 30', and the connection of the motor to the roll is shown in FIGURE 5.

The motor 40' has its frame rigidly connected to a housing 76 which is attached to the support 77. An armature shaft 80 is connected by a flexible coupling 82 to a sleeve 84 that rotates in a self-aligning spherical roller bearing assembly 86 having seals 88. The sleeve 84 is connected to an axle 89 of the roll 14'. This assembly is held in a counterbore in the housing 76 by a snap ring 90. The center of curvature of the self-aligning bearing is at the center of the flexible coupling 82 which results in a minimum dislocation for misalignment in assembly of the roll in a train of rolls.

The sleeve 84 is secured to the roll 14' and provides the support for the roll 14' at its left-hand end. The right-hand end of the roll 14' is supported on an axle 20' which can be the same as that used for the roll of FIGURE 2.

Figure 6:
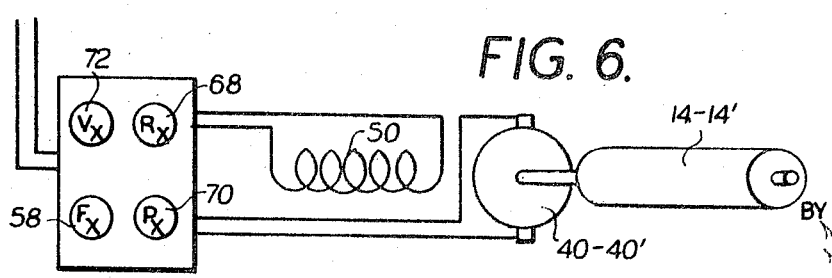
FIGURE 6 is a diagrammatic view showing the external controls for the roll and motor shown in the other views.

FIGURES 6 and 7 show the circuit for the roll motor 40 or 40'. The wiring diagram shown in FIGURE 7 constitutes the power pack for the motor.

In a conventional direct current motor, an armature with slots is placed opposite salient pole pieces. The continuous iron length of the pole faces the armature where the iron is interrupted by slot openings. The amount of iron lengths on the two sides varies as the armature rotates.

When the armature is at standstill with only light excitation of the armature and poles, very little torque is generated and the armature seeks a position where a maximum of iron carries the maximum magnetic flux. A noticeable force pulls the armature into this position and must be overpowered to start the armature rotation.

With this invention the excitation of both the armature and field is adjusted, so that a slight "nudge" is necessary to start rotation of the armature. This makes it possible to hold the armature at standstill by magnetic means without depending upon the unreliable standstill friction which varies with lubrication, temperature, and other factors.

The field 50 of the motor 40 or 40' is excited by a constant-voltage rectifier circuit in which the excitation is controlled by a series resistance 58 ($F_x$). This resistance is set for a selected value which is not changed in operation.

The armature 54 power supply has a constant-reference voltage obtained from a Zener diode 60, and this reference voltage is compared with a voltage drop of a resistance network and the error voltage is amplified and fed to the direct current coil of a saturated core reactor 64.

FIGURE 7 illustrates a positive feedback which overrules the otherwise constant current control. The resultant is an increase in current for an increase in terminal voltage $E_x$ of the armature 54. The network for the feedback works as follows:

The voltage from the Zener diode is compared with the voltage $V_{BD}$.

The current control tends to make the two voltages equal.

$$V_{BD}=V_{AB}-V_Z \quad (1)$$

and therefore $$V_Z=I_xR_x-\alpha E_x \quad (2)$$

or $$I_x=\frac{V_z+\alpha E_x}{R_x} \quad (3)$$

without feedback, that is for $\alpha=0$, Equation 3 is reduced to $$I_x=\frac{V_z}{R_x} \quad (4)$$

That means that the current is adjusted by a resistance 68 ($R_x$) and is independent of the output voltage $E_x$.

If the feedback is introduced by making alpha greater than zero, the current increases when the terminal voltage becomes larger; and this increase is proportional to the terminal voltage and is controlled by a potentiometer 70 ($P_x$).

The maximum output voltage of the power pack depends upon the setting of a Variac 72 ($V_x$). The instantaneous voltage varies and depends on the load.

The performance of a direct current motor is represented by two formulae:

$$T=k_1I\phi=K_1I \quad (5)$$

and $$E=IR+k_2n\phi$$
$$=IR+K_2n \quad (6)$$

The symbols in the two formulae stand for

I=armature current, amperes
E=voltage impressed on armature, volts
R=total resistance in armature circuit, ohms
N=speed of armature, r.p.m.
$\phi$=field, maxwells
T=torque, inch-lbs.

The field is assumed to be constant in operation. Therefore we combine $$k_1\phi=K_1$$
$$k_2\phi+K_2 \quad (7)$$

Equation 5 shows that the torque of the motor is proportional to the current.

FIGURE 8 is a graph showing terminal voltage and speed plotted against armature current and torque. According to Equation 6 above, armature voltage minus resistance voltage drop is proportional to the armature speed and this is represented by the IR line in FIGURE 8. With the circuit set for a voltage E and current I, the speed is represented by the line $n$ parallel to the IR line, and the torque is represented by the same line that represents the current, this line being indicated by the legends I and T. Equilibrium exists at the point P.

In FIGURE 9 the line of a load is introduced into the speed torque diagram. If the supply is set for current I, the resulting voltage and speed will be $E_1$ and $N_1$.

Equilibrium exists only for point $P_1$. The motor accelerates or decelerates to this point and demands voltage $E_1$.

The diagram (FIGURE 9) also shows the point $P_{max}$ for the maximum voltage $E_{max}$ which the power supply can deliver. The corresponding current $I_{max}$ is the maximum current the circuit can use regardless of the capacity of the supply. If the current control is set for a higher current, there will be excess torque when the maximum voltage is reached and the excess torque tends to accelerate the armature beyond the speed $n_{max}$. If that happens the counterelectromotive force increases beyond the voltage capacity of the supply. The motor characteristics overrule the control of the supply and motor reverts to point $P_{max}$ with current $I_{max}$. Only by increasing the external load can the system of motor and supply be forced into using a current higher than $I_{max}$.

Another special point is the minimum current $I_{min}$ corresponding to the torque which starts the armature rotation by overcoming the starting friction. The voltage connected with this current is the IR drop for $I_{min}$ because the counterelectromotive force for barely moving is practically zero.

A motor which is connected to a supply of constant current does not behave like a motor connected to a conventional constant voltage. In the conventional circuit, the motor draws current depending on its load condition. If the motor is stalled, the current becomes excessive, limited only by the circuit resistance.

If a motor is connected to a supply of constant current, the motor torque stays constant from standstill to maximum speed. The characteristics of the load determine the speed and with it, the terminal voltage of the motor. This may be summarized as follows:

For constant voltage (conventional), voltage is constant, current depends on load;

For constant current, current is constant, voltage depends on load.

A constant torque motor is not suitable for friction compensation because the friction torque increases with higher speed. Therefore, the circuit of this invention has a positive feedback from the motor speed. The counterelectromotive force is proportional to the speed but for practical reasons, the terminal voltage is used. The voltage differs from the counterelectromotive force only by the IR drop, which may be neglected.

FIGURE 10 shows the result of the addition of positive feedback. The torque speed curve is slanted in the direction of the curvature of the friction torque. By changing the amount of feedback, the slope of the curve can be adjusted to match the friction curve.

The behavior characteristics of the motor are not changed. The terminal voltage is still determined by the speed.

Figure 11:
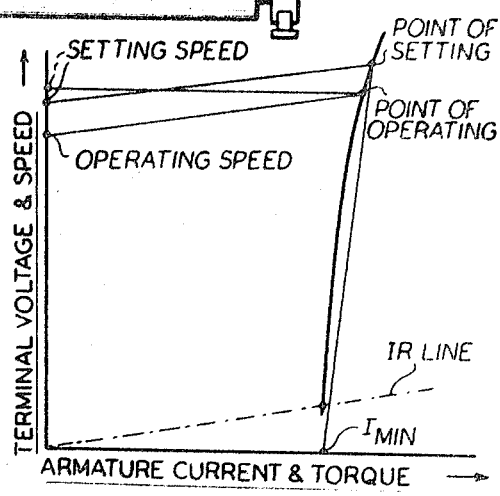

FIGURE 11 shows the new torque line matched with the friction line. It can be seen that the free torque around the operating point has been minimized.

Thus it will be apparent from FIGURE 10 that this invention, with the positive feedback adjusted to produce a variation in torque which approximates the friction torque, results in a roll drive having no free torque at the intended speed of a support roll and having only a minimum of free torque when operating at other speeds. The invention relieves a web of tension by providing propulsion for the support rolls and provides only minimal forces on the web when there are variations in speed from the intended web speed.

The preferred embodiments of the invention have been illustrated and described, but changes and modifications can be made and some features may be used in different combinations.

What is claimed is:

1. A support roll for a web including bearings on which the roll turns and means for compensating friction of the roll comprising an electric motor having an armature operably connected with the roll, a substantially constant current supply circuit for the motor armature, a feedback control responsive to the motor speed and correlated with the armature current supply circuit to overrule the otherwise constant current and to produce an increase in armature current and motor torque substantially proportional to the increase in roll friction with increase in roll speed.

2. The support roll described in claim 1 characterized by a control in the current supply circuit for limiting the armature current to a value that produces a motor torque substantially equal to the roll friction at the different roll speeds.

3. The support roll described in claim 2 characterized by the feedback control including means adjustable to change the rate of variation of the motor torque to accommodate the friction changes of the particular roll that is driven by the motor.

4. The support roll described in claim 1 characterized by the motor having an electrically excited field, and adjustable means in the circuit of the armature for changing the maximum voltage supplied to the armature, and other adjustable means in the circuit of the field for adjusting the voltage supplied to the field.

5. The support roll described in claim 1 characterized by the field of the motor being permanent magnets, and adjustable means in the circuit of the armature for changing the maximum voltage supplied to the armature.

References Cited

UNITED STATES PATENTS

| | | | |
|---|---|---|---|
| 2,796,222 | 6/1957 | Frankel | 226—42 X |
| 3,160,802 | 12/1964 | Abell | 226—42 X |

ALLEN N. KNOWLES, Primary Examiner

U.S. Cl. X.R.

226—42, 178, 188; 318—6